(12) United States Patent
Carberry et al.

(10) Patent No.: US 8,530,840 B2
(45) Date of Patent: Sep. 10, 2013

(54) OCCUPANCY SENSOR WITH UNIVERSAL MOUNT

(75) Inventors: Brian J. Carberry, Portland, OR (US); David Flinchbaugh, Vancouver, WA (US)

(73) Assignee: Leviton Manufacturing Company, Inc., Melville, NY (US)

( * ) Notice: Subject to any disclaimer, the term of this patent is extended or adjusted under 35 U.S.C. 154(b) by 22 days.

(21) Appl. No.: 13/370,356

(22) Filed: Feb. 10, 2012

(65) Prior Publication Data
US 2013/0207528 A1 Aug. 15, 2013

(51) Int. Cl.
*G01J 5/00* (2006.01)

(52) U.S. Cl.
USPC ...................................... 250/338.1

(58) Field of Classification Search
USPC ............................. 250/338.1–338.5
See application file for complete search history.

(56) References Cited

U.S. PATENT DOCUMENTS

| 7,800,049 | B2 | 9/2010 | Bandringa et al. |
| 7,800,498 | B2 | 9/2010 | Leonard et al. |
| 2009/0177080 | A1 * | 7/2009 | Kristan et al. ............... 600/424 |
| 2011/0216546 | A1 | 9/2011 | Lombardi et al. |

FOREIGN PATENT DOCUMENTS

JP       2001077177 A  *  3/2001

OTHER PUBLICATIONS

"OSFHU Passive Infrared Fixture Mount High Bay Occupancy Sensor", Product Data Sheet, Rev. Jan. 2012, (c) 2012 Leviton Manufacturing Co., Inc.
"High Bay/Low Bay Passive Infrared Occupancy Sensor and Offset Adapter", Leviton Installation Instruction Sheet, PK-93439-10-00-5C, (c) 2009 LevitonMfg Co., Inc.
OSFHU Passive Infrared Fixture Mount High Bay Occupancy Sensor, Product Data Sheet, Rev. Apr. 2011, (c) 2011 Leviton Manufacturing Co., Inc.
"Multi-Technology Ceiling Mounted Occupancy Sensor," Leviton Installation Instruction Sheet, PK-93586-10-00-)A, (c) 2009 LevitonMfg Co., Inc.
"Ultrasonic Ceiling Mounted Occupancy Sensor," Leviton Installation Instructions Sheet, PK-93585-10-00-0A.

* cited by examiner

*Primary Examiner* — Kiho Kim
(74) *Attorney, Agent, or Firm* — Kacvinsky Daisak PLLC

(57) ABSTRACT

An occupancy sensor may include a plurality of user-selectable mounting features that enable the sensor to be mounted to building structure in a variety of ways. The sensor may include: a nipple for engaging a connector associated with the building structure; one or more key hole slots for engaging fasteners associated with the building structure; and one or more flat side surfaces for engaging corresponding flat surfaces of a mounting plate associated with the building structure. A spring on the flat side surface may lock the sensor to the mounting plate. The nipple may be removable to allow the sensor to be flush mounted to the building structure. The sensor may also include a user-adjustable lens that enables a user to make discrete adjustments of the field of view of the sensor according to present levels. Other embodiments are disclosed and claimed.

29 Claims, 18 Drawing Sheets

OCCUPANCY SENSOR WITH UNIVERSAL MOUNT

FIELD OF THE DISCLOSURE

The present disclosure relates generally to occupancy sensors, and more particularly to an improved mounting arrangement for an occupancy sensor that facilitates universal mounting to lighting fixtures or luminaires, walls and/or ceilings or ceiling tiles via any of a variety of user selectable connection schemes.

BACKGROUND OF THE DISCLOSURE

Occupancy sensing technologies are used to monitor the presence of occupants in indoor and outdoor spaces. Occupancy sensing systems conserve energy by automatically turning off lighting and other electrical loads when the space is unoccupied or vacant. They may also perform a convenience function by automatically turning on lighting and other loads when an occupant enters a space. An occupancy sensor can include one or more detectors based on any of the numerous different sensing technologies, such as passive infrared (PIR) sensing, ultrasonic (U/S) sensing, audio sensing, video sensing, and the like. The occupancy sensor often includes logic to process signals from the detector and provide an on/off signal that indicates whether the space is occupied or unoccupied. Occupancy sensors also can include a timing device for an "AutoOFF" feature to occur after a last logic event.

An occupancy sensing system generally includes at least two components: an occupancy sensor and a switching device. The sensor generally needs to be positioned in a location that is selected to have a clear view of the entire space that is to be monitored for occupants. Such locations can include ceilings, relatively high on walls, fixtures, or other relatively inaccessible locations.

Positioning the occupancy sensor generally involves mounting the sensor to an electrical box located behind the wall or ceiling surface, and running appropriate electrical wiring through the wall sheathing or ceiling panel from the box to the sensor. A variety of different mounting schemes exist, and the particular scheme used in an individual application often depends on the application, the building, the mounting location, and/or other factor(s). It would be desirable to provide an occupancy sensor with a variety of different mounting features and/or capabilities, thus making the occupancy sensor versatile enough to enable it to be mounted to a wall, ceiling panel, or fixture using any of a plurality of mounting schemes. Such a design would reduce or eliminate the need to manufacture different versions of the sensor (where each version is designed to correspond to a particular mounting scheme).

To provide a further measure of versatility and ease of installation, it would also be desirable to provide an occupancy sensor with a discretely adjustable lens portion that can be used reliably by an installer to adjust the sensor's field of view based on the particular application (e.g., by fine tuning the lens portion to change one or more sensitivity points within a field of view).

SUMMARY OF THE DISCLOSURE

An occupancy or vacancy sensor is disclosed. The occupancy or vacancy sensor may include a housing having a front surface, a back surface, and a side surface. The side surface may include a spring engagement member. The sensor may further include a mounting plate having a first face engageable with the back surface of the sensor housing and a second face including one or more key-hole slots and a nipple portion that extends away from the housing. The spring engagement member, the one or more key hole slots, and the nipple may be configured to enable coupling of the sensor to a structure mounting surface via one or more of the spring engagement member, slots, and nipple. The spring engagement member may be configured to enable selective coupling of the sensor to a correspondingly shaped surface of a structure mounting surface. The one or more key-hole slots may be configured to enable selective coupling of the sensor housing to a fastener associated with the structure mounting surface. The nipple portion may be configured to enable selective coupling of the sensor housing to a female connector associated with the structure mounting surface.

A method for mounting a sensor is disclosed. The method may comprise: providing a sensor having a sensor housing and a mounting plate, the sensor housing having a front surface, a back surface, and a side surface. The side surface may include a spring engagement member. The mounting plate may be engaged with the back surface of the sensor housing. The mounting plate may have a face including one or more key-hole slots and a nipple portion that extends away from the housing. The method may further comprise selectively coupling the sensor housing and mounting plate to a structure mounting surface via one of a plurality of different mounting features disposed on the sensor housing and the mounting plate. A first one of the plurality of different mounting features may comprise the spring engagement member of the sensor housing. A second one of the plurality of different mounting features comprises one or more key-hole slots of the mounting plate. A third one of the plurality of different mounting features may comprise the nipple portion of the mounting plate.

An arrangement is disclosed for adjusting a field of view of an occupancy sensor. The fixture may include a sensor housing and a lens assembly including a lens portion and a mounting portion. The sensor housing may include a forward recess portion for receiving the mounting portion therein. The mounting portion may be rotatable with respect to the sensor housing to adjust a field of view of a sensor disposed behind the lens portion. The mounting portion of the lens assembly may have at least one protrusion for releasably engaging a protrusion of the sensor housing. The position of the mounting portion protrusion and the sensor housing protrusion may be associated with a predetermined field of view of the sensor.

An occupancy or vacancy sensor is disclosed. The occupancy or vacancy sensor may comprise a housing having a front surface, a back surface, and a side surface. The side surface may include a spring engagement member. The sensor may further include a mounting plate having a first face engageable with the back surface of the sensor housing and a second face including a nipple portion that extends away from the housing. The spring engagement member and the nipple may be configured to enable coupling of the sensor to a structure mounting surface via one or both of the spring engagement member and nipple. The spring engagement member may be configured to enable selective coupling of the sensor to a surface of a structure mounting surface. The nipple portion may be configured to enable selective coupling of the sensor housing to a female connector associated with the structure mounting surface.

BRIEF DESCRIPTION OF THE DRAWINGS

By way of example, a specific embodiment of the disclosed device will now be described, with reference to the accompanying drawings, in which.

DETAILED DESCRIPTION

The disclosed occupancy sensor can mount to building structure in any of a plurality of ways. For example, it may be surface mounted to a fixture or flat surface using keyholes, it may be back mounted to a knockout opening using a threaded nipple, or it may be flush mounted to a fixture using a side-quicksnap feature. The occupancy sensor is versatile, providing a single device that can be attached to electrical equipment housings of building structures having a plurality of mounting arrangements.

In addition, the occupancy sensor may include a rotatable lens portion that enables the sensor's field of view to be quickly and easily adjusted to fit a desired installation. Providing a variety of pre-set adjustment points would enable the installer to quickly and easily adjust the field of view simply by rotating the lens to one of the adjustment points. In some embodiments, the lens portion may be rotatable up to 180-degrees with respect to the housing. There may be any number of stops, and stops may be provided at any intervening positions up to 180-degrees. In one embodiment, stops may be provided at 45-degrees, 90-degrees, 135-degrees and 180-degrees.

Figure 1:
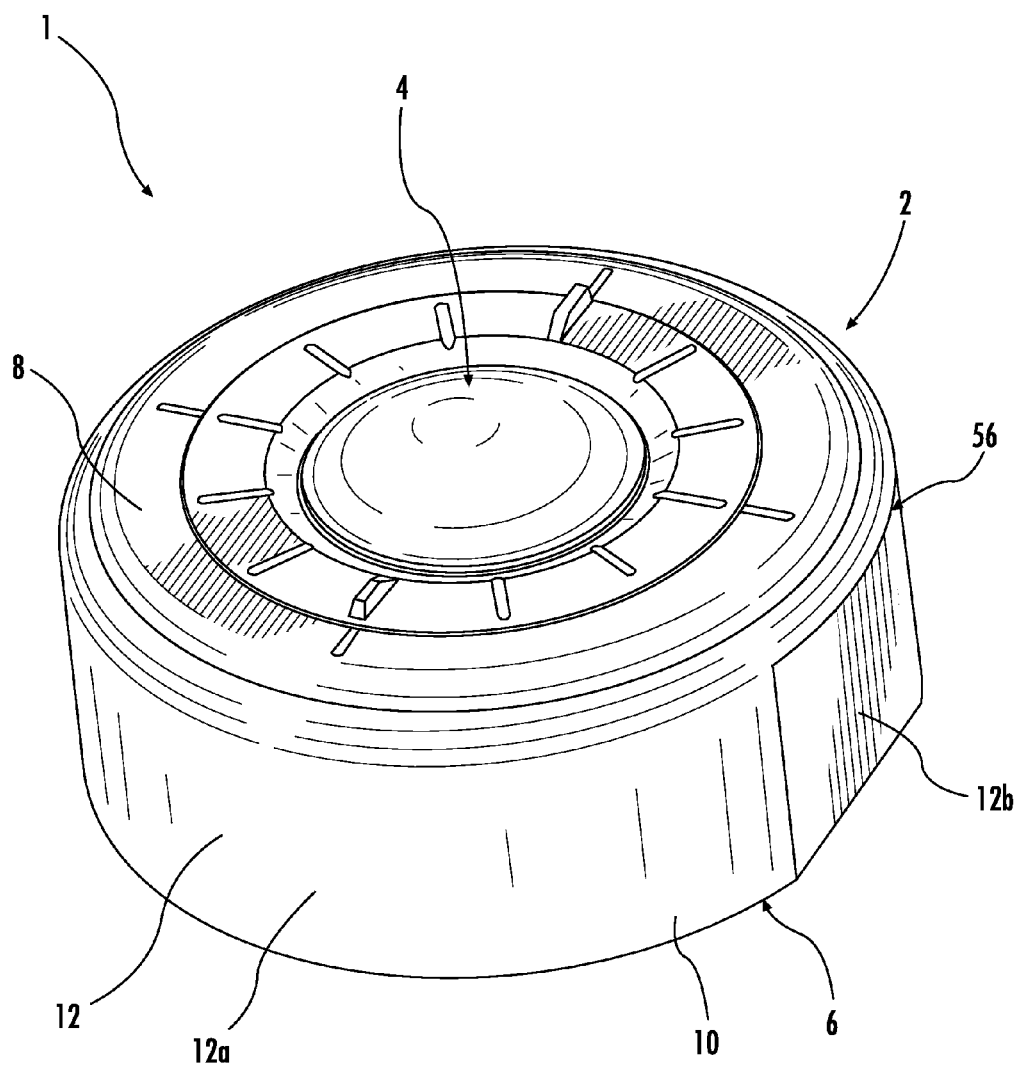
FIG. 1 is an isometric view of an exemplary occupancy sensor in accordance with the disclosure.
Figure 2:
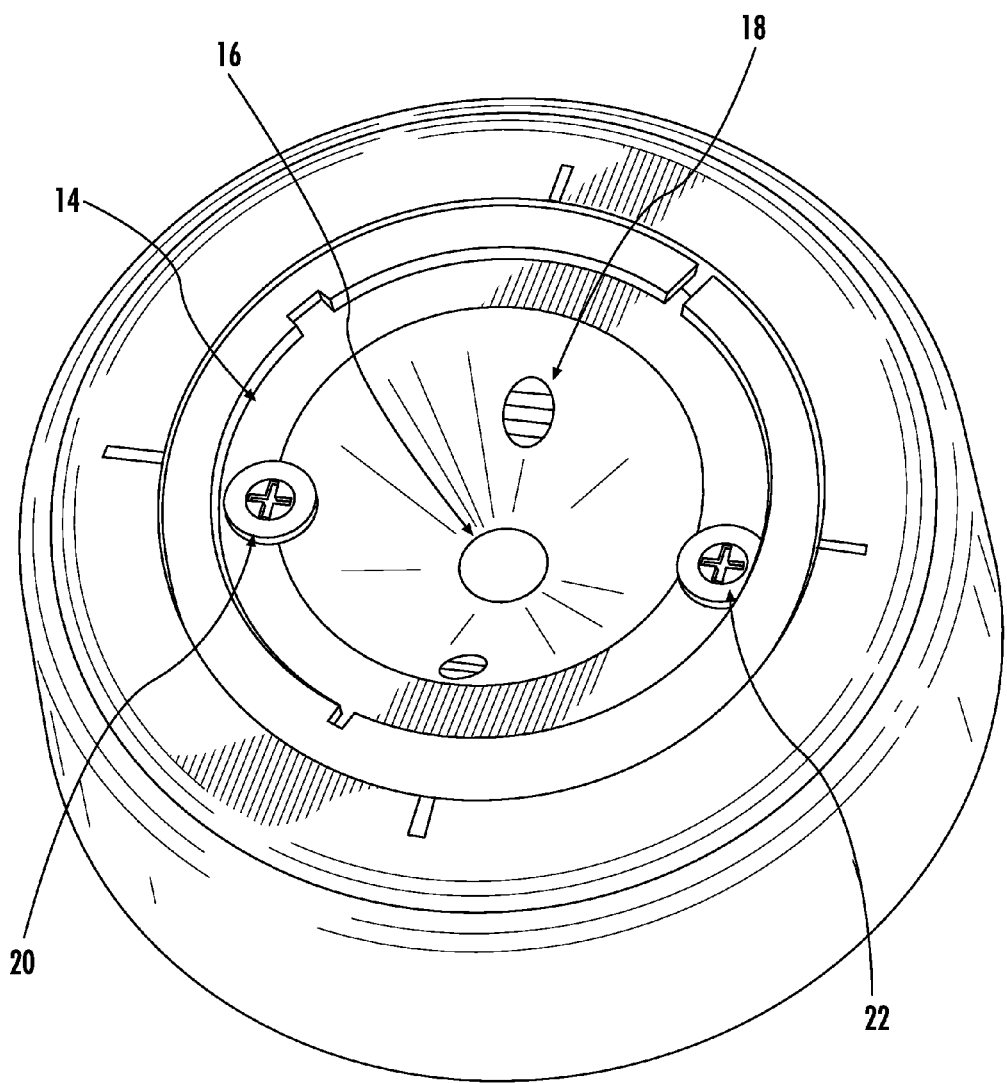
FIG. 2 is an isometric view of the occupancy sensor of FIG. 1 with a lens portion removed.

FIGS. 1 and 2 show an occupancy sensor 1 according to one embodiment of the disclosure. The sensor 1 may include a housing portion 2, a lens portion 4 and a mounting plate portion 6. The housing portion 2 may include a front surface 8, a back surface 10 and a side surface 12. In one embodiment, the side surface 12 may be generally cylindrical and include a curved portion 12a and a flat portion 12b. The front surface 8 may include a recess 14 for receiving the lens portion 4, while the back surface 10 may engage the mounting plate portion 6. As shown in FIG. 2, one or more sensors 16 may be positioned on the front surface 10 within the recess 14 so that the sensor resides beneath the lens portion 4 when the device is fully assembled. In one embodiment, the sensor 16 is a passive infrared (PIR) sensor, though this is not critical and any of a variety of other sensor types can be used, including, but not limited to, ultrasonic (U/S) sensors, audio sensors, video sensors, gas sensors, and the like.

FIG. 2 shows the occupancy sensor with the lens portion 4 removed. As can be seen, in one embodiment, the sensor 16 is disposed in the recess 14 so that it is generally centered under the lens portion 4 when the lens portion is fit to the housing portion 2. In the illustrated embodiment, a light emitting diode 18 is disposed in the recess 14, as are time delay 20 and sensitivity adjustment 22 interfaces.

Figure 3A:
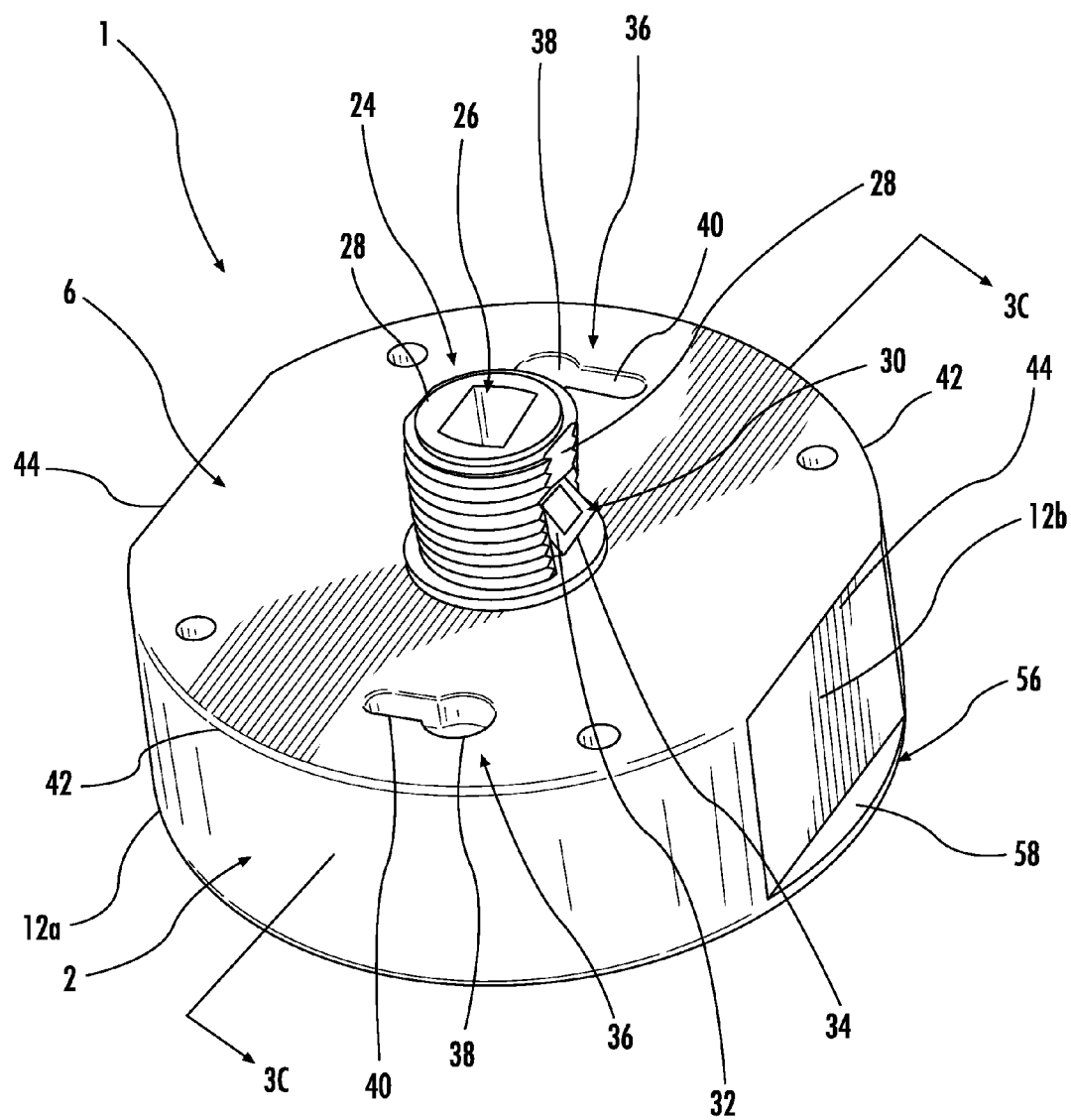
FIG. 3A is a reverse isometric view of the occupancy sensor of FIG. 1.

Referring to FIG. 3A, the mounting plate portion 6 may include a nipple 24 extending from the sensor 1. The nipple 24 may be a generally cylindrical protrusion having a central opening 26 for receiving electrical wires (not shown) for connecting the sensor 1 to an electrical box associated with a fixture or building structure. The nipple 24 may be externally threaded to enable positive coupling with a female connector (not shown) associated with the fixture or building structure. In some embodiments, the nipple 24 may include a pair of diametrically opposed flat regions 28 that can be received within a "double-D" hole associated with the building structure to prevent rotation of the sensor upon installation. The nipple 24 may further include a snap-lock feature comprising a spring-biased tab 30 that can positively engage a surface of the female connector to lock the sensor to the connector. The spring-biased tab 30 may have a ramp portion 32 and a flat stop portion 34 so that as the female connector is moved into progressively greater engagement with the nipple 24, the sliding interaction between the connector and the ramp portion 32 presses the tab inward. When the connector is substantially fully engaged with the nipple 24, the tab 30 springs back outward so that the stop portion 34 engages a surface of the connector, preventing the connector from disengaging from the sensor 1. The connector may later be released by manually pressing the tab inward to disengage the stop portion from the connector. In some embodiments, the snap lock feature includes a pair of spring-biased tab 30 positioned on opposite sides of the nipple 24.

The mounting plate portion 6 may also include one or more key-hole slots 36, each slot including an enlarged portion 38 and a locking portion 40. The enlarged portion 38 may be sized to receive the head of a fastener associated with the building structure, while the locking portion 40 may be relatively narrower and sized to prevent removal of the head of the fastener once the fastener shank is received in the locking portion 40. The illustrated embodiment includes a pair of opposing keyhole slots 36. It will be appreciated, however, that greater or fewer such key-hole slots may be provided.

As can be seen, the outer surface geometry of the mounting plate portion 6 substantially conforms to the outer surface geometry of the housing portion 2. Thus, the mounting plate portion has a generally cylindrical shape with a pair of diametrically opposed curved portions 42, and a pair of diametrically opposed flat portions 44 corresponding to respective curved and flat portions 12a, 12b of the housing portion 2.

Figure 3B:
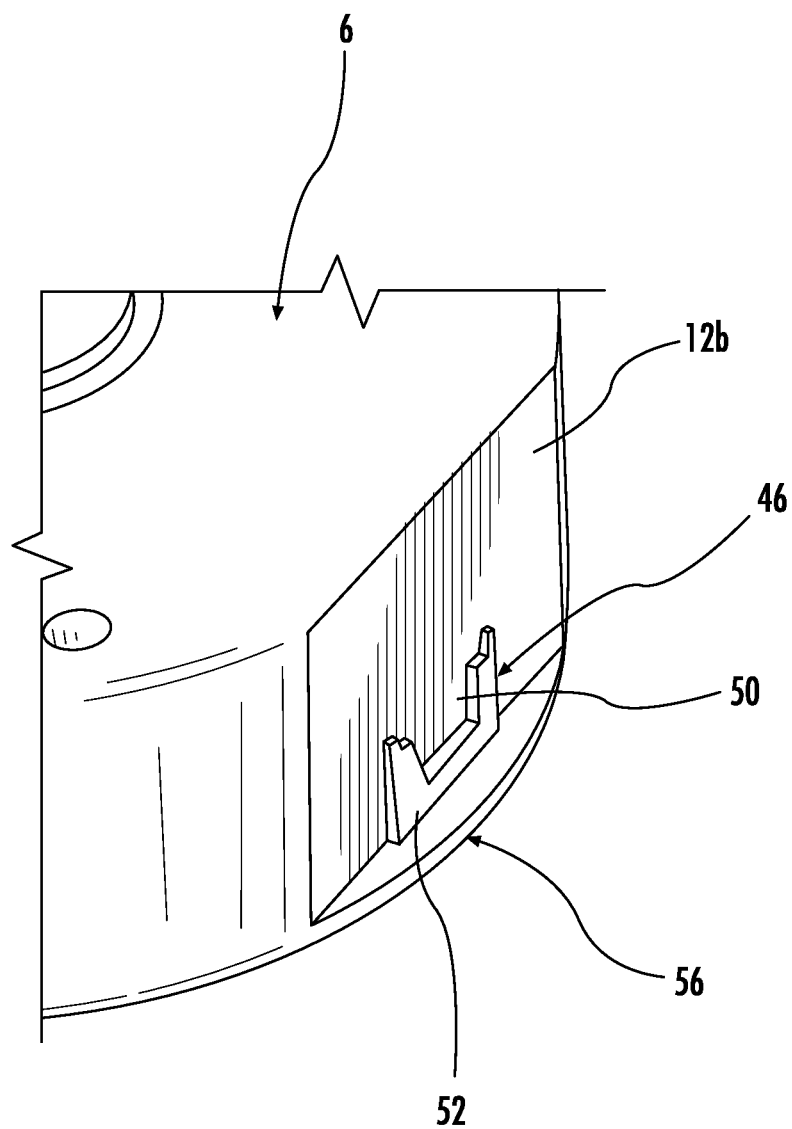
FIG. 3B is a detail view of a side portion of the occupancy sensor shown in FIG. 3A.

FIG. 3B shows a snap-lock feature provided on the flat portions 12b of the housing portion 2. This snap-lock feature may include a spring-biased tab 46 positioned on each of the flat portions 12b that can positively engage a surface of a structure mounting plate 48 (FIGS. 4 and 5) to axially lock the sensor 1 to the mounting plate (and building structure). The spring-biased tab 46 may have a ramp portion 50 and a flat stop portion 52 so that as the sensor is pressed into engagement with the mounting plate 48, the sliding interaction between the mounting plate 48 and the ramp portion 50 presses the tab inward. When the sensor 1 is substantially fully engaged with the mounting plate 48, the tab 46 springs back outward so that the stop portion 52 engages a back face 54 of the plate (see FIG. 5), preventing the sensor from disengaging from the plate. The sensor 1 may later be released by manually pressing the tabs 46 inward to disengage the stop portions 52 from the mounting plate 48. It will be appreciated that the snap-lock feature can be integrally molded or formed with the housing portion 2, or it can be a separate piece or pieces that are assembled onto the housing portion 2.

Figure 3C:
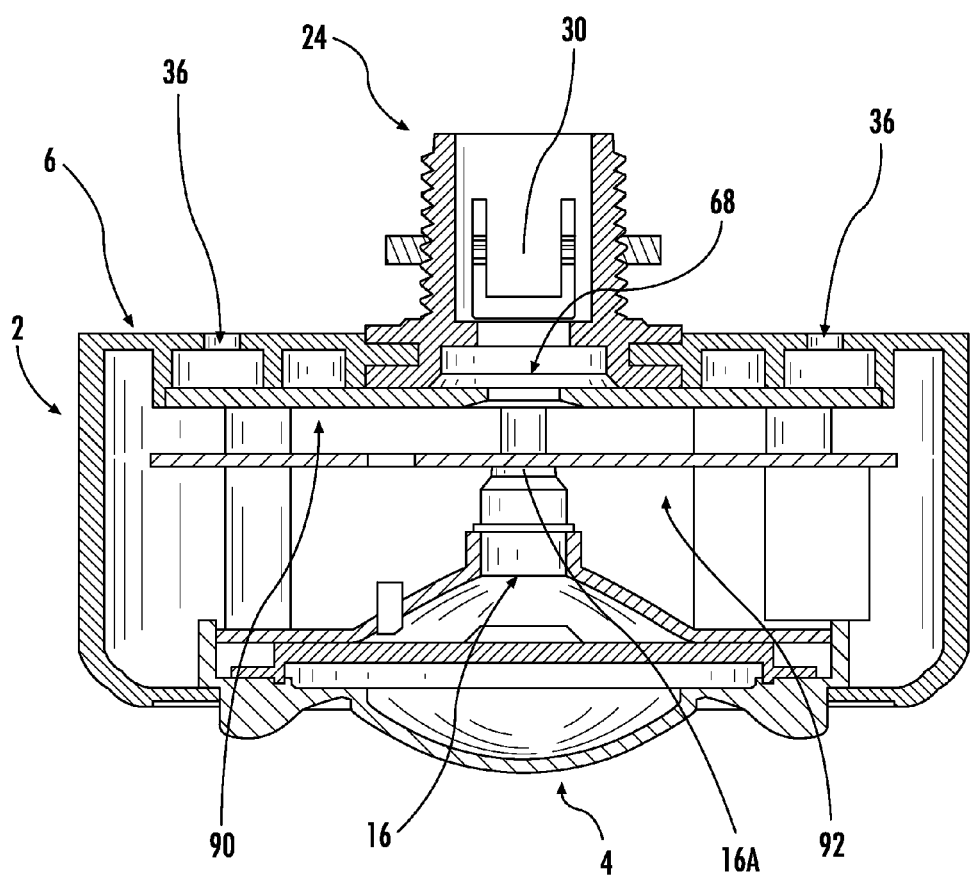
FIG. 3C is a cross-section view of the occupancy sensor of FIG. 1, taken alone line 3C-3C of FIG. 3A.

FIG. 3C is a cross-section view of the sensor 1 showing the internal stack up and interrelation of components. Specifically, the lens portion 4 is fit into the recess 14 of the housing portion 2 such that the sensor 16 is positioned between the lens portion and the housing portion 2. A back end 16a of the sensor 16 is coupled to a printed circuit board (PCB) 92, which is coupleable to wiring (not shown) running through the pipe nipple 24. As will be described in greater detail later, an access guard 90 is positioned between the PCB and the mounting plate portion 6 to close off the key-hole slots 36 and a central recess 68 of the mounting plate portion 6 to the interior of the housing portion 2. Such closure prevents contact between screw heads received in the key-hole slots and the internal "live" components of the sensor 1 (e.g., the PCB 92 and sensor 16). The guard also may protect such internal components from the ingress of moisture which could prematurely degrade the sensor 1.

Figure 4:
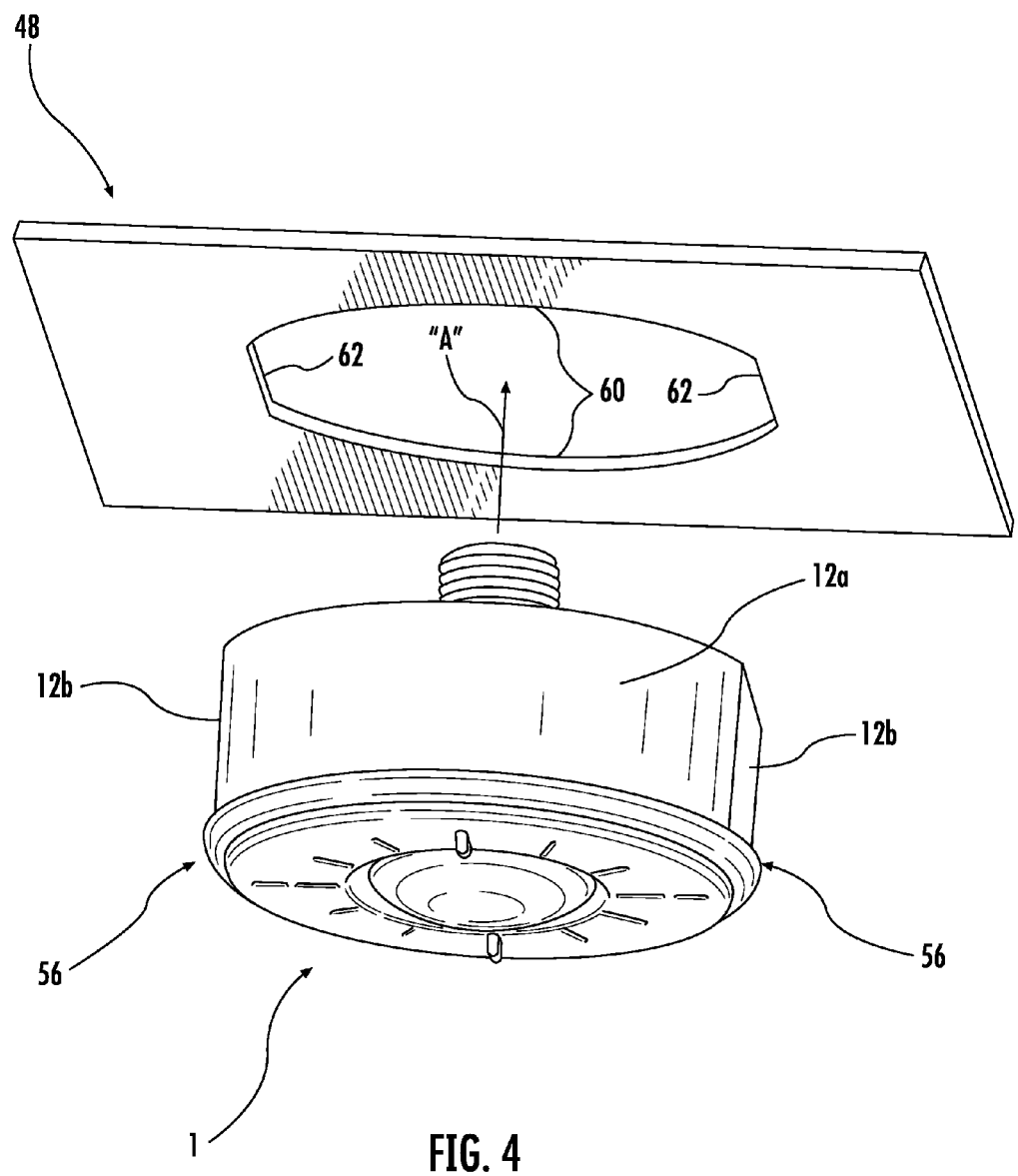
FIG. 4 is an isometric view of the occupancy sensor of FIG. 1 shown in exploded relation to an exemplary mounting plate.
Figure 5:
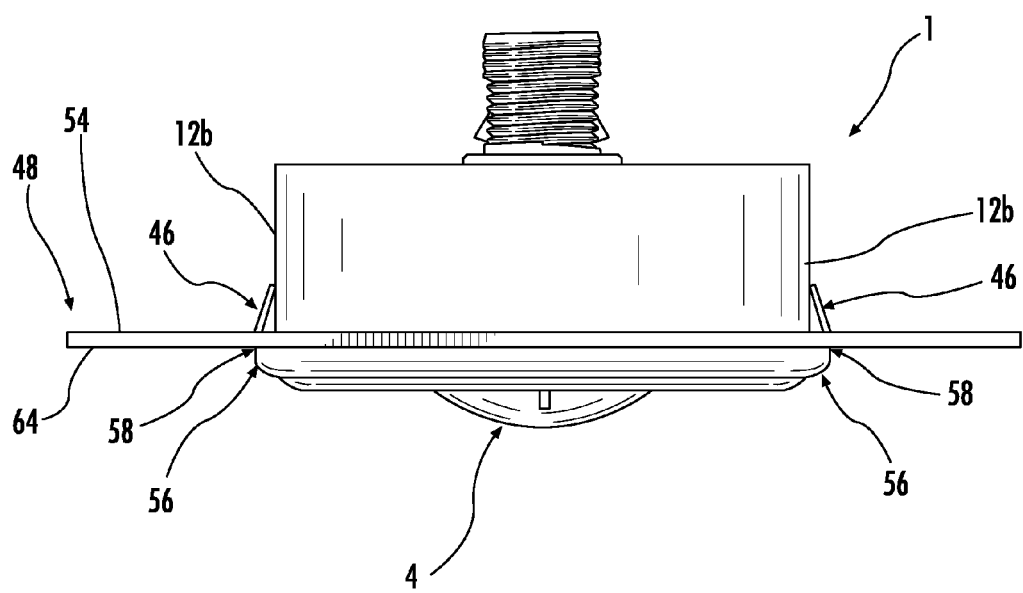
FIG. 5 is a side view of the occupancy sensor engaged with the exemplary mounting plate of FIG. 3A.

Referring again to FIG. 1, the front surface 8 of the sensor housing includes an edge rim 56 that conforms to the curved portion 12a of the side surface 12, and that extends past the flat portions 12b of the side surface, providing the front surface with a circular outer geometry. As shown in FIG. 3A, the edge rim 56 forms a flat abutting surface 58 adjacent to each of the flat portions 12b of the housing portion 2. As can be seen in FIGS. 4 and 5, the curved and flat portions 12a, 12b of the housing correspond to curved and flat portions 60, 62 of a mounting plate 48 associated with building structure. Thus, as the sensor 1 is moved toward the mounting plate 48 in the direction of arrow "A," the corresponding curved and flat portions of the sensor and the plate engage. As shown in FIG. 5, the edge rim 56 and flat abutting surface 58 engage a front face 64 of the mounting plate 48, while the spring tabs 46 engage the plate's back face 54. Thus arranged the sensor is axially and rotationally fixed to the mounting plate 48 and the associated building structure.

Figure 6:
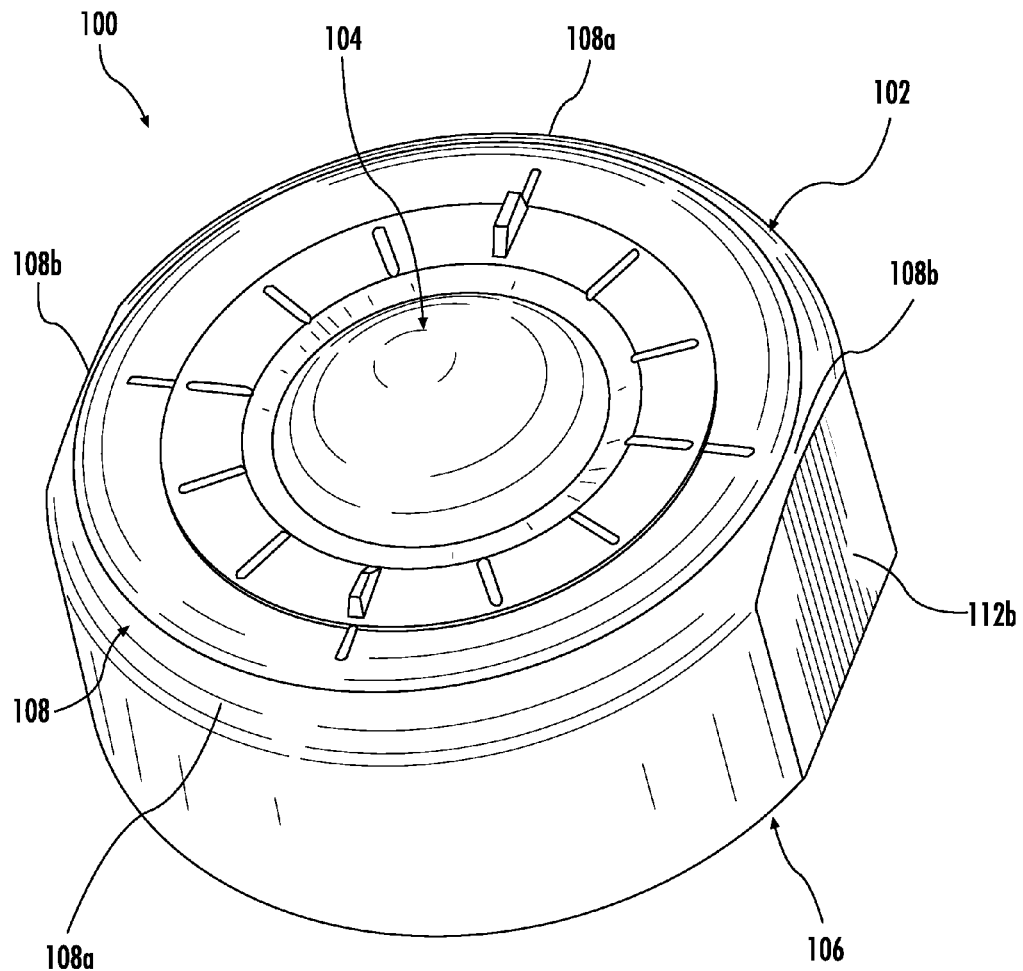
FIG. 6 is an isometric view of another embodiment of the disclosed occupancy sensor.
Figure 7:
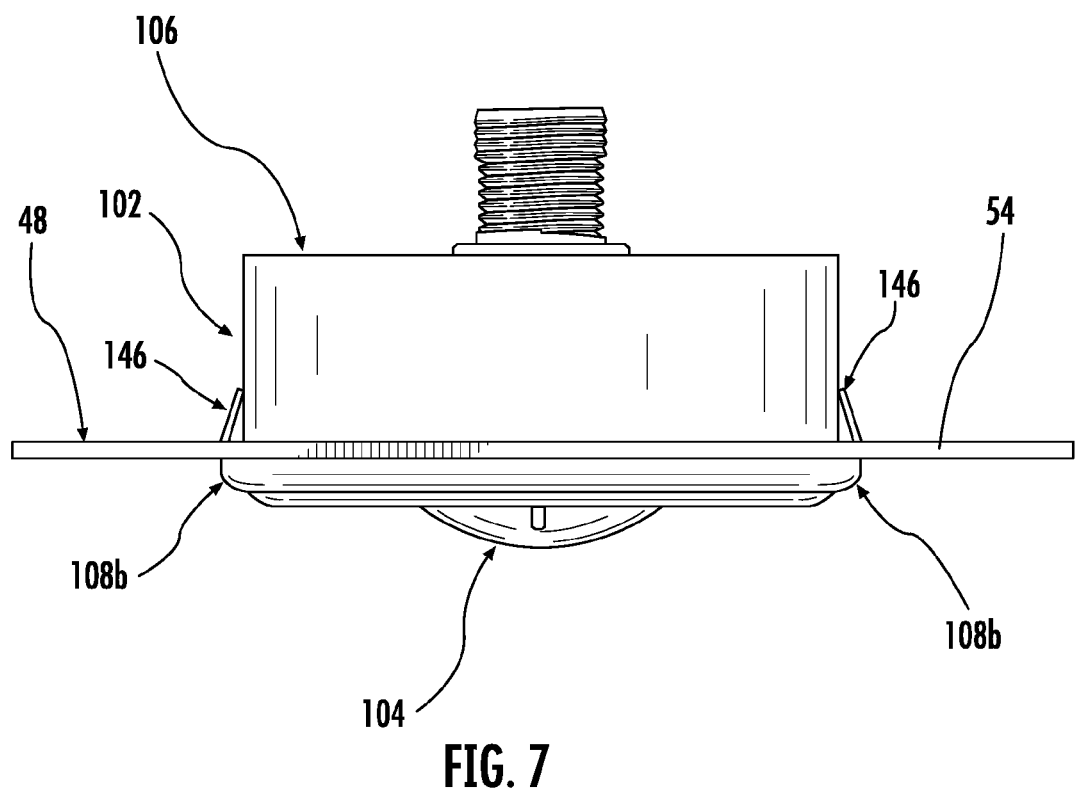
FIG. 7 is a side view of the occupancy sensor engaged with the exemplary mounting plate of FIG. 6.

FIGS. 6 and 7 show an embodiment of the disclosed occupancy sensor 100 including a housing portion 102, a lens portion 104 and a mounting plate portion 106. The lens portion 104 and mounting plate portion 106 of sensor 100 may be substantially the same as the lens and mounting plate portions described in relation to sensor 1 of FIGS. 1-5. Likewise, the housing portion 102 may be substantially the same as the housing portion of sensor 1, with the exception that the front surface 108 of the housing portion includes first and second curved peripheral portions 108a and first and second flat peripheral portions 108b that correspond to the curved and flat side portions 112a, 112b of the housing portion 102. Thus, the sensor 100 of this embodiment does not include a protruding edge rim adjacent to the flat portions of the housing portion. Thus, a front view of the sensor 100 shows the flat sides (as opposed to sensor 1 which has a circular appearance from the front). The sensor 100 may include any or all of the other features described in relation to the sensor 1 of FIGS. 1-5, including spring tabs 146 which are substantially the same as spring tabs 46 which have been previously described.

FIG. 7 shows the sensor 100 engaged with a mounting plate 48 in a manner similar to that described in relation to FIG. 5. Namely, the curved and flat portions 112a, 112b of the housing correspond to curved and flat portions of an opening in the mounting plate 48. As will be appreciated, the mounting plate 48 may be associated with building structure or fixture, such as a wall or ceiling. Thus, when the sensor 100 is inserted into the mounting plate, the corresponding curved and flat portions of the sensor and the plate engage. The spring tabs 146 on either side of the housing portion 102 engage the plate's back face 54. As will be appreciated, the inter-engagement between the back face 54 of the mounting plate 48 and the spring tabs 146 prevents the sensor 102 from backing out of the mounting plate opening.

Figure 8:
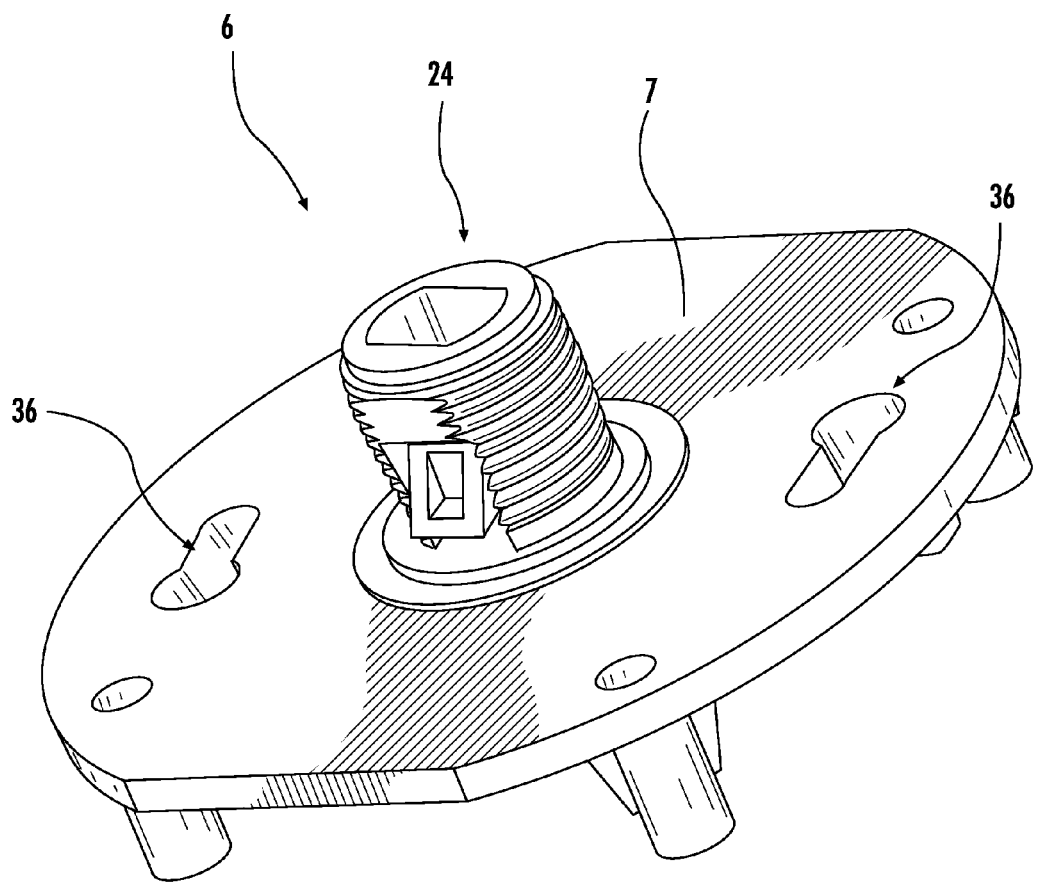
FIG. 8 is an isometric view of a plate portion of the occupancy sensor of FIG. 1.
Figure 9:
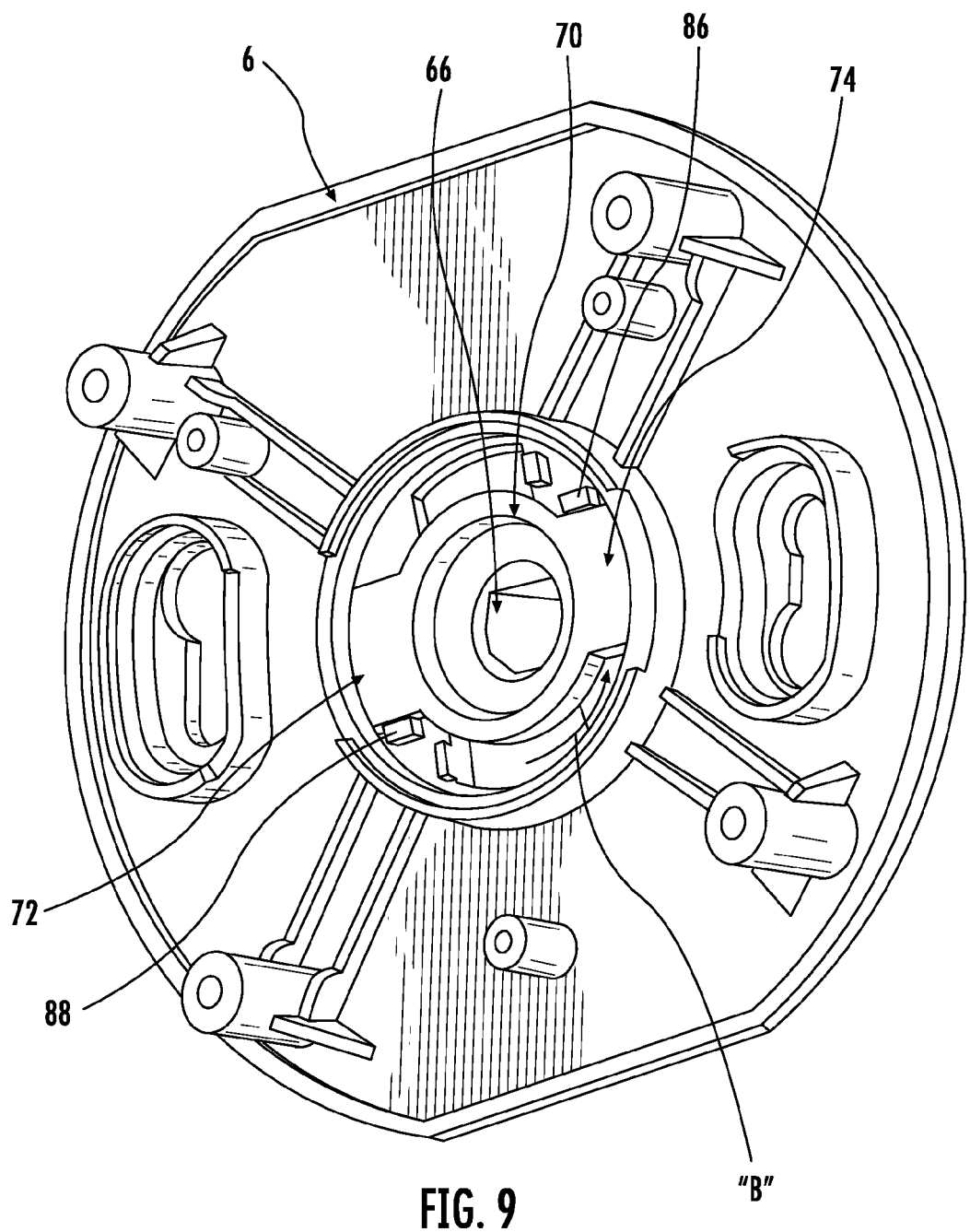
FIG. 9 is a reverse isometric view of the plate portion of FIG. 8.
Figure 10:
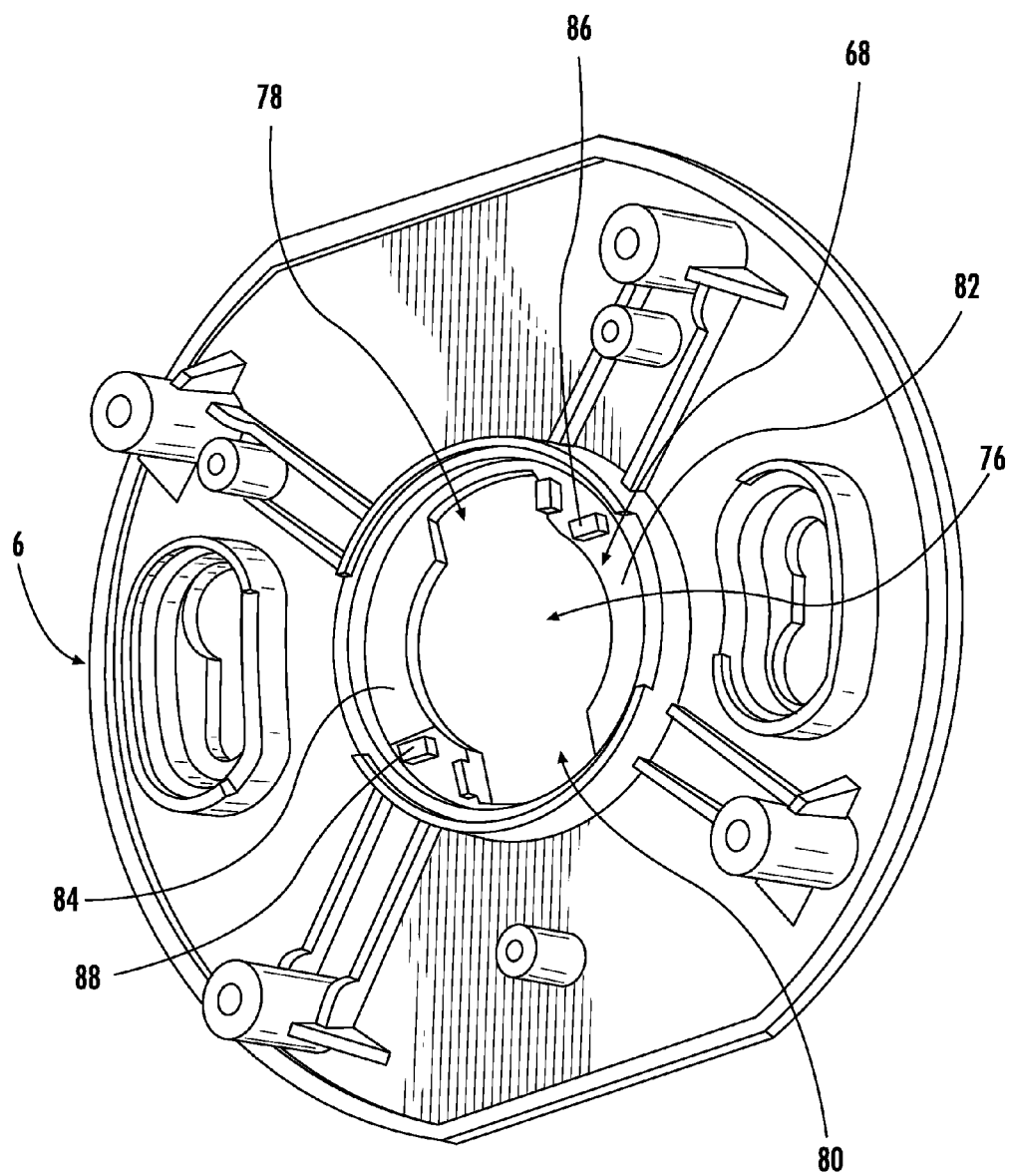
FIG. 10 is a reverse isometric view of the plate portion of FIG. 8 with the nipple portion removed.

Referring now to FIG. 8, an exemplary mounting plate portion 6 (or 106) is shown in which the nipple 24 is selectively removable. This feature can be advantageous for applications in which the sensor 1 is mounted to building structure via the key-hole slots 36. In such cases, it may be desirable that the back surface 7 of the mounting plate portion 6 be mounted flush with a wall, ceiling, or fixture surface in order to engage mounting fasteners with the key-hole slots. Thus, removing the nipple provides a substantially flat back profile for the sensor 1 to enable flush mounting. FIG. 9 is a reverse view of the mounting plate portion 6 in which the nipple 24 is engaged with the mounting plate portion 6. FIG. 10 is a similar view, except that the nipple has been disengaged from the mounting plate portion 6.

As can be seen in FIGS. 9 and 10, an engagement end 66 of the nipple 24 is received within a central recess 68 in the mounting plate portion. The engagement end 66 may comprise a projection having a circular portion 70 and first and second radially-projecting tabs 72, 74. The central recess 68 may comprise a circular opening 76 having first and second tab receiving recesses 78, 80 disposed at opposite sides of the circular opening 76.

During assembly, the engagement end 66 can be aligned with the central recess 68 so that the circular opening 76 may receive the circular portion 70 of the nipple and the first and second tab receiving recesses 78, 80 may receive the first and second radially-projecting tabs 72, 74. So aligned, the engagement end 66 can be pressed through the central recess 68 until the tabs 72, 74 pass through the tab receiving recesses 78, 80. Once the engagement end 66 is received within the central recess 68, the nipple may be rotated in a first direction (identified by arrow "B" in FIG. 9) to rotate the tabs 72, 74 out of alignment with their respective recesses 78, 80. In this rotated position, the tabs 72, 74 are captured behind locking surfaces 82, 84 of the mounting plate portion 106, thereby locking the nipple 24 and the mounting plate portion 6 together.

In the illustrated embodiment, rotating the nipple 24 by about 90 degrees configures the nipple from the unlocked position to the locked position with respect to the mounting plate portion 6. Over-rotation is prevented via a pair of projections 86, 88 positioned on the locking surfaces 82, 84 which contact respective side surfaces of the tabs 72, 74 when the nipple is rotated into a fully locked configuration.

It will be appreciated that although the removable nipple arrangement has been described in relation to mounting plate portion 6, its features may be equally applicable to mounting plate portion 106 of sensor 100.

Figure 11:
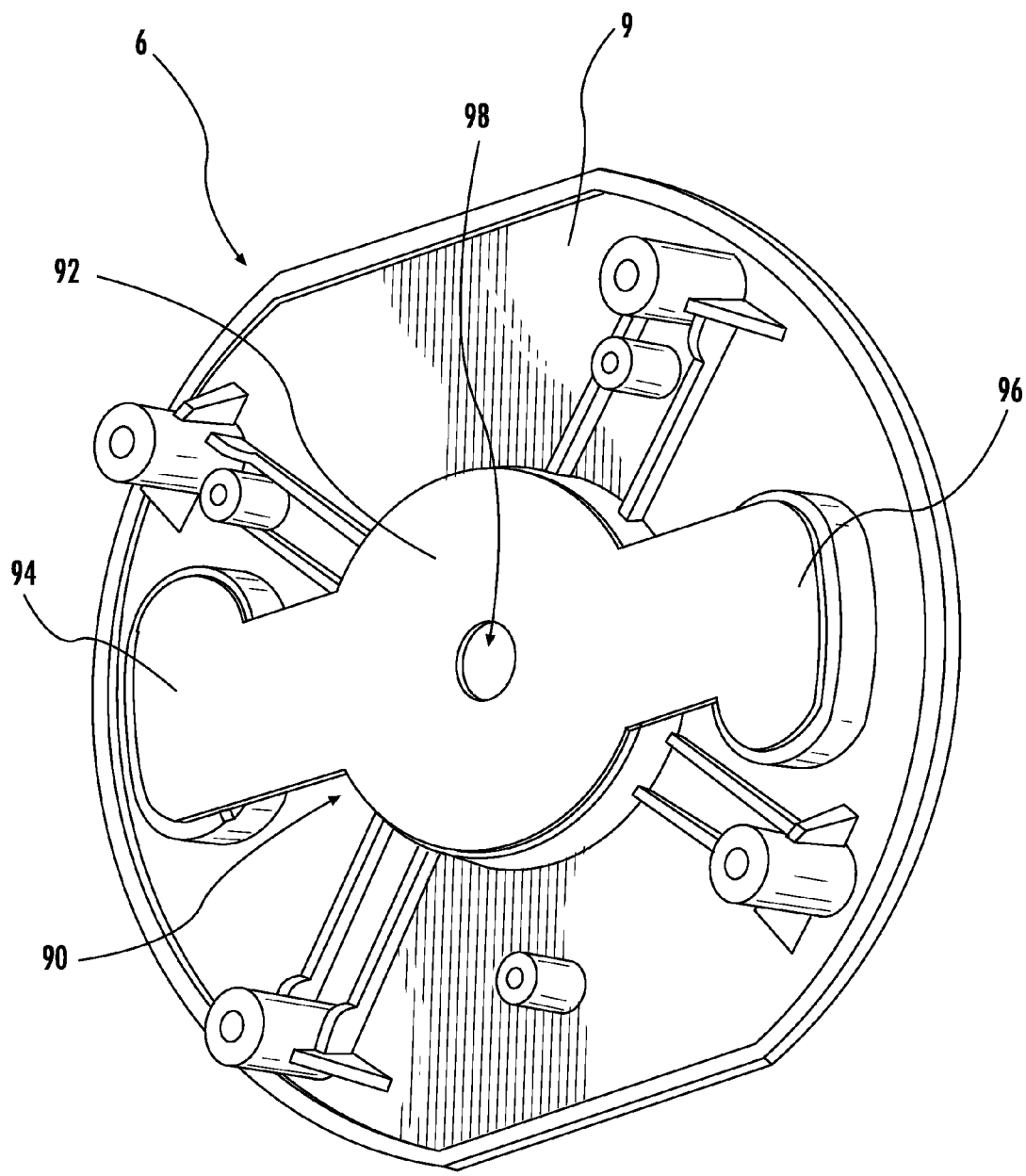
FIG. 11 is the view of the plate portion of FIG. 8 with an access guard included.
Figure 12:
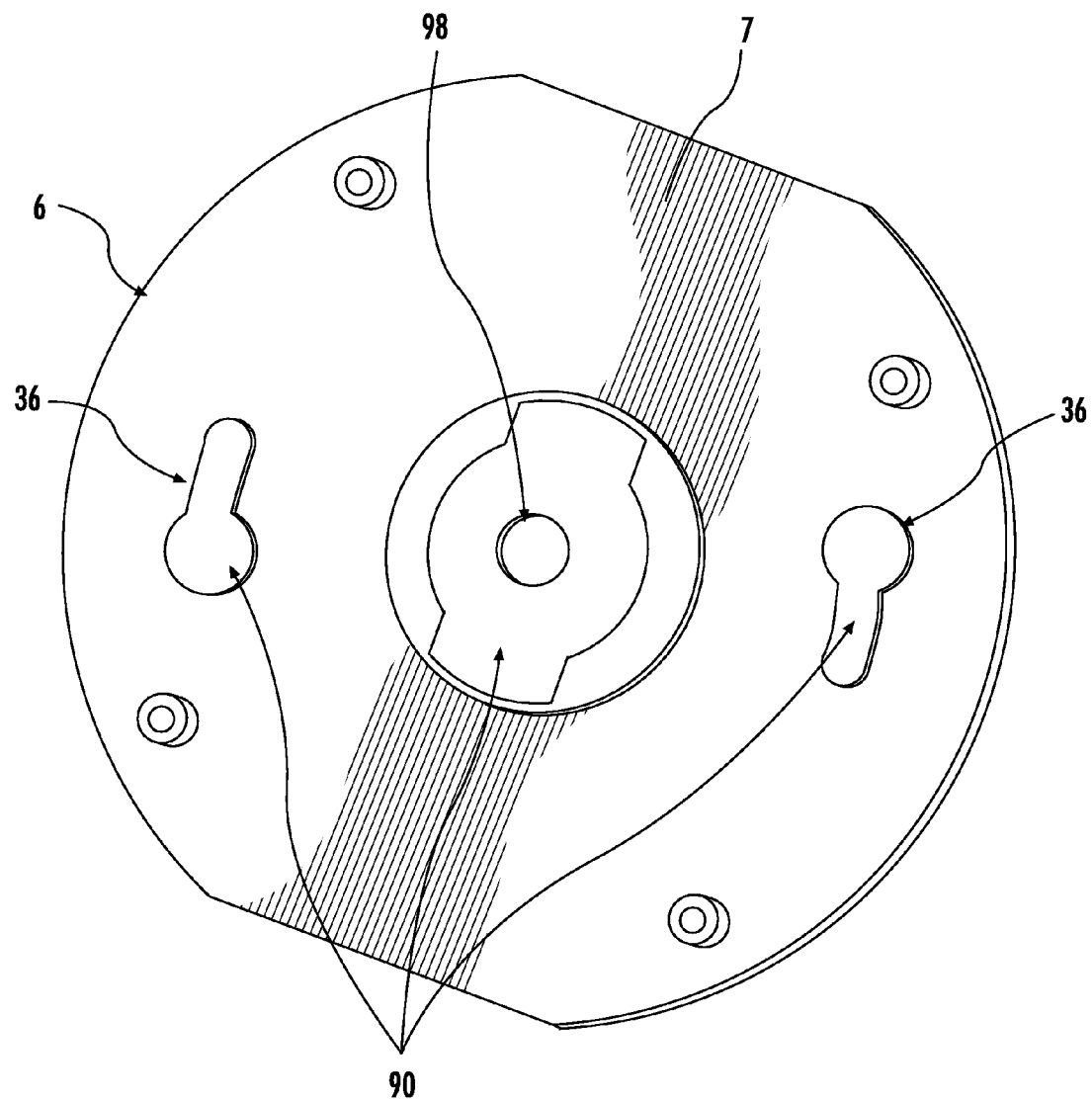
FIG. 12 is a reverse isometric view of the plate portion of FIG. 11 with the access guard.

FIGS. 11 and 12 show an access guard 90 for use in closing off the key-hole slots to the interior of the housing portion 2. The access guard 90 may also close off the central recess 68 of the mounting plate portion 6 when the nipple 24 is removed. It will be appreciated that by closing off these openings, the screw heads received in the key-hole slots are prevented from contacting any internal "live" components of the sensor 1 (e.g., a printed circuit board portion 92 and sensor 16) (see FIG. 3C). The guard also may protect such internal components from the ingress of moisture which could prematurely degrade the sensor 1. As shown the access guard 90 is a single piece that fits against a front surface of the mounting plate portion 6. The guard 90 includes a central guard portion 92 that fits over the central recess 68 of the mounting plate portion 6, and a pair of elongated portions 94, 96 that extend to, and fit over, the keyhole slots 36. An opening 98 may be provided in the central guard portion 92 to accommodate the pass through of electrical wiring from the sensor.

In one exemplary embodiment, the access guard 90 may fit within correspondingly shaped raised portions of the mounting plate portion 6. These raised portions can hold the access guard 90 in position. Retention of the access guard 90 with respect to the mounting plate portion 6 can be enhanced through the use of a suitable adhesive. Although the access guard 90 is illustrated as being a single piece, it will be appreciated that it could instead be made of multiple pieces.

Figure 13:
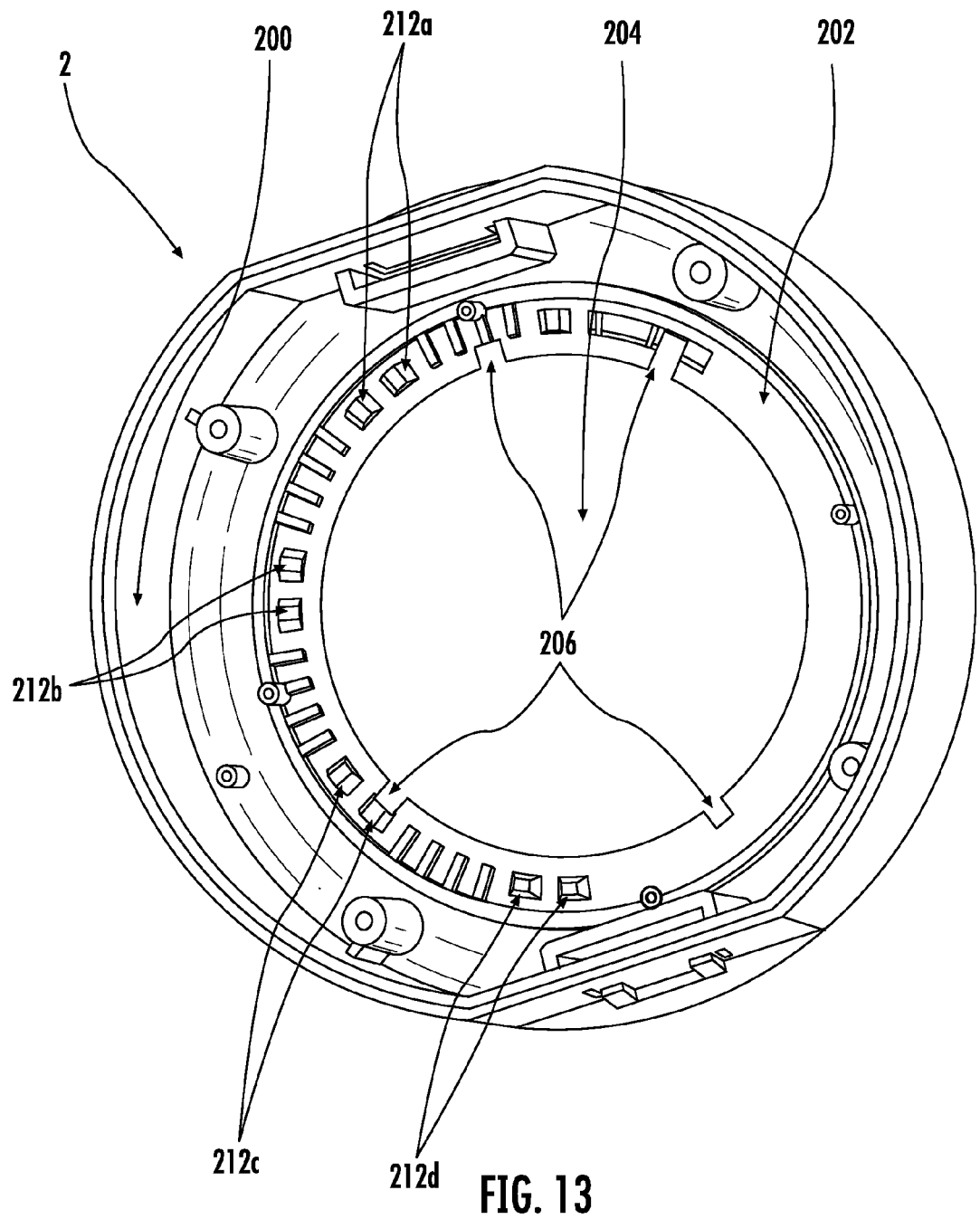
FIG. 13 is an isometric view of a housing portion of the occupancy sensor of FIG. 1.
Figure 14:
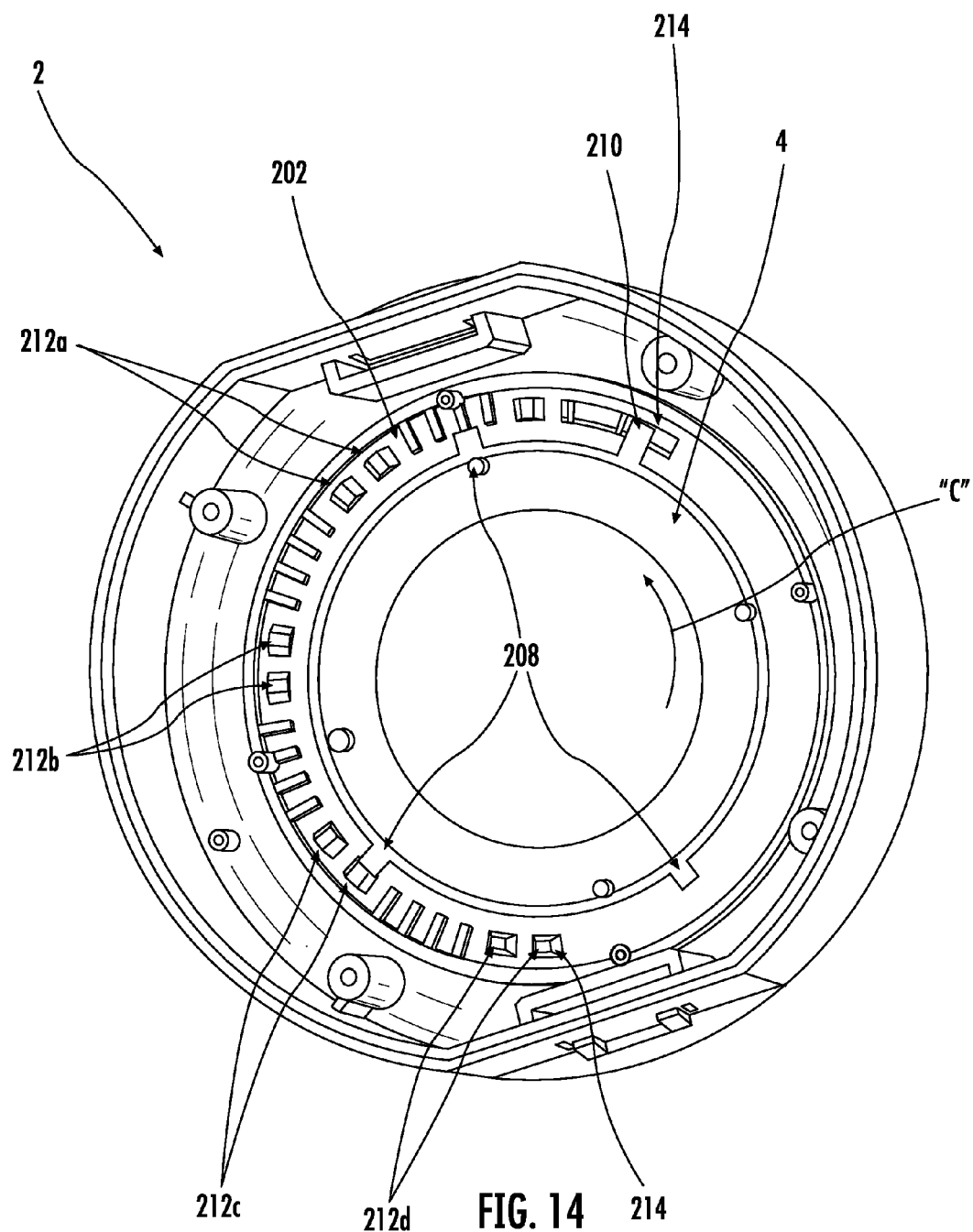
FIG. 14 is an isometric view of the housing portion of FIG. 13 with a lens portion installed.
Figure 15:
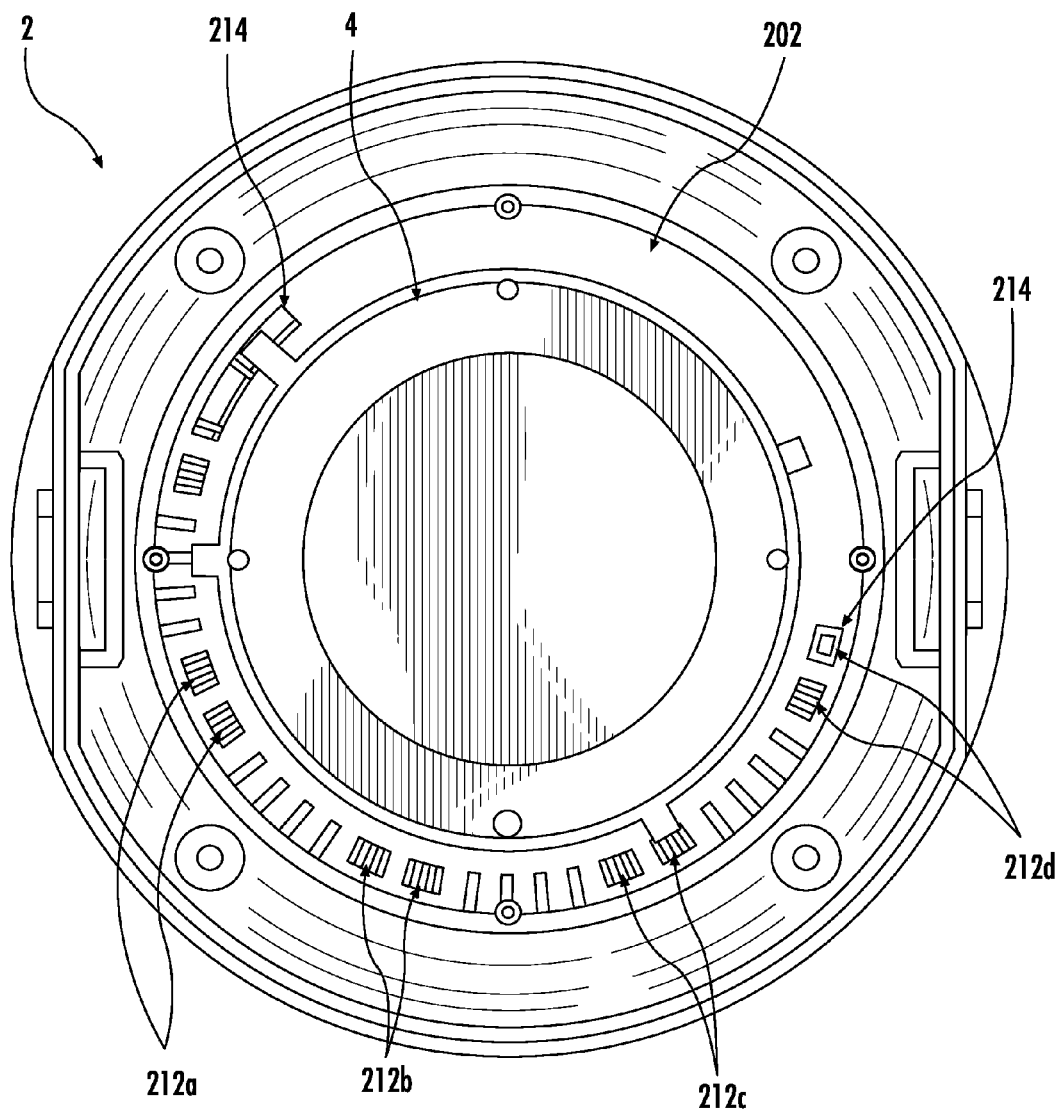
FIG. 15 is a plan view of the housing portion of FIG. 13 with a lens portion installed.

Referring now to FIGS. 13-15, a lens portion adjustment feature will be described in greater detail. As noted, the lens portion 4 may be adjustable to enable the sensor to be focused on a particular area of a space being monitored. The disclosed sensor 1 may include a plurality of preset lens adjustment settings to enable an installer to adjust the sensor's field of view based on a particular application. As shown, the housing portion 2 may have a generally hollow interior with an inner side surface 200 and an inner front surface 202. The inner front surface 202 defines a generally circular opening 204 in the front of the sensor 1 for receiving the lens portion 4. In addition to the opening 204, the inner front surface 202 also defines a plurality of radially projecting slot openings 206 for receiving corresponding projecting ears 208, 210 of the lens portion 4. To engage the lens portion 4 with the housing portion 2, the projecting ears 208, 210 are aligned with the slot openings 206 and the lens portion is pressed into engagement with the housing portion 2. This insertion position is shown in FIG. 14. To lock the lens portion 4 to the housing portion 2, the two pieces are rotated with respect to each other so that the projecting ears 208, 210 engage the inner front surface 202 of the housing portion (see FIG. 15). Thus configured, the lens portion 4 is axially locked to the housing portion 2, while still remaining rotatable with respect to the housing portion.

As previously noted, the field of view of the sensor may be adjusted by rotating the lens portion 4 with respect to the housing portion 2. In the illustrated embodiment, a plurality of preset rotational positions are provided via respectively positioned pairs of projections 212a, b, c, d disposed on the inner front surface 202 of the housing portion 2. As can be seen, one of the projecting ears 210 of the lens portion 4 is longer than the others. Thus, when the lens portion 4 is rotated with respect to the housing portion 2 (for example, in the direction of arrow "C"), this longer ear 210 will catch between a pair of projections 212a, b, c or d, holding the lens portion at a particular angle, which corresponds to a particular preset field of view of the sensor 1. The ear 210 can be moved past a particular pair of projections 212a, b, c or d by applying a small rotational force to the lens portion 4. The lens portion 4 may then be rotated so that the ear 210 engages a next pair of projections 212a, b, c or d, which corresponds to a different preset field of view of the sensor 1. The shorter ears 208 are short enough that they do not contact the projections. It will be appreciated that the interaction between the longer ear 210 of the lens portion 4 and the projections 212a, b, c or d of the sensor housing 2 may provides the user with a tactile response upon engagement of the longer ear with a particular pair of projections.

Hard stops 214 may be provided adjacent to the 0-degree position and the 180-degree position to prevent over-rotation of the lens portion 4 with respect to the housing portion 2. In some embodiments, one or more of the hard stops 214 may constitute one of the projections of a pair of projections (e.g., pair 212d)

In one embodiment, the lens insertion position corresponds to a 0-degree position, which may correspond to a suitable mark or marks on the front of the lens portion 4 and housing portion 2. The pairs of projections 212a, b, c or d may be provided at spaced intervals so that the lens portion 4 is rotatable with stops at 45-degrees, 90-degrees, 135-degrees and 180-degrees with respect to the 0-degree insertion position. It will be appreciated that the pairs of projections can be spaced at any of a variety of desired intervals, and thus are not limited to the discrete placements of 45, 90, 135 and 180 degrees. In addition, fewer or greater numbers of projection pairs can be provided at equal or unequal spacings, and over smaller or greater portions of the circumference of the housing portion 2.

Figure 16C:
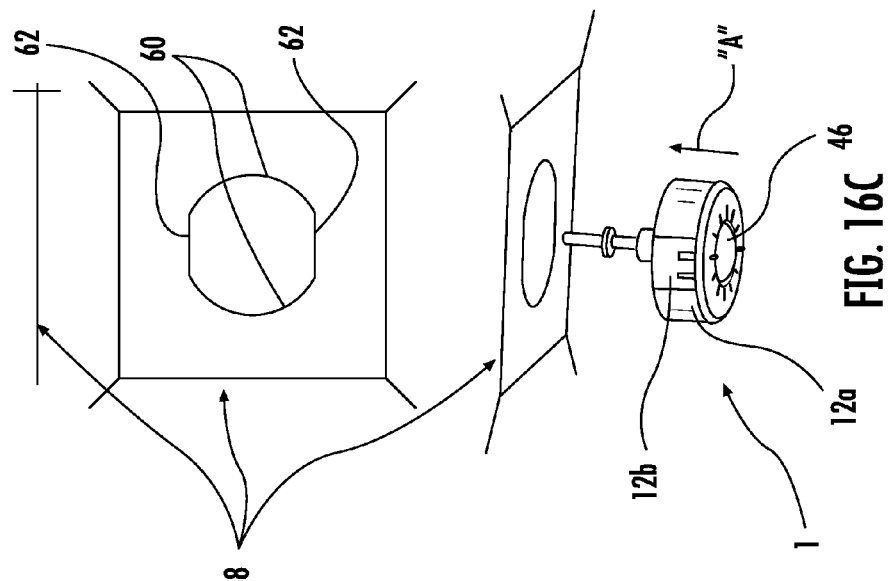
FIGS. 16A-C are isometric views of three exemplary installation techniques for mounting the disclosed occupancy sensor to a mounting plate associated with a building structure.
Figure 16B:
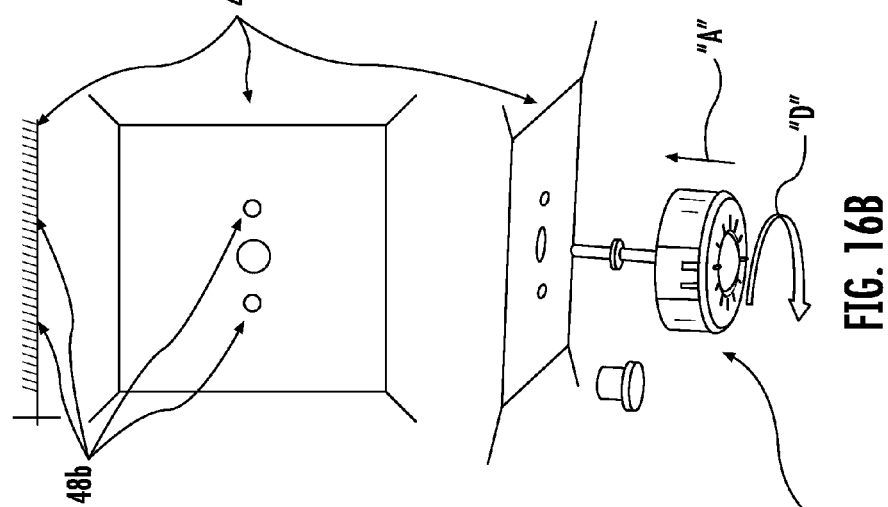
Figure 16A:
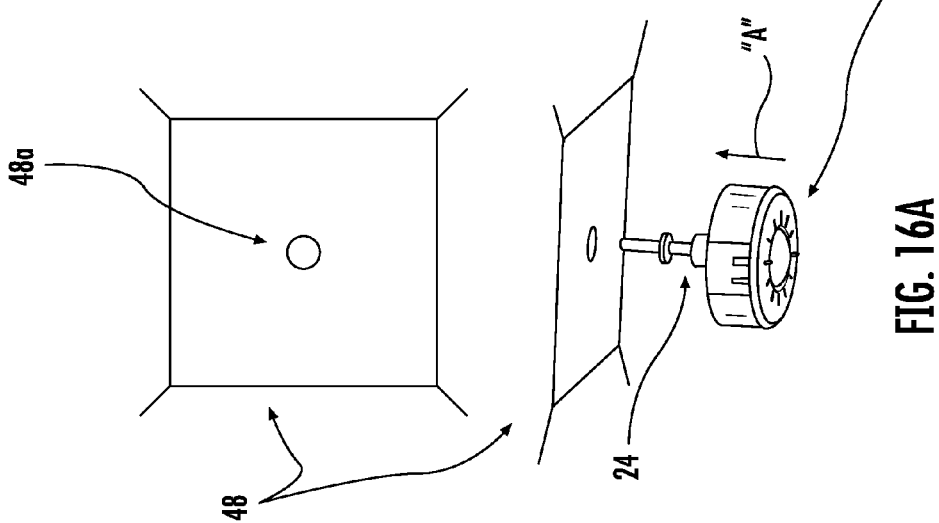

FIGS. 16A-C show three different techniques for engaging the sensor 1 (or 100) with a mounting plate 48 associated with building structure, such as a wall, ceiling, or fixture. FIG. 16A shows an embodiment in which the sensor 1 is mounted using the pipe nipple 24. In this embodiment, the sensor 1 is moved in the direction of arrow "A" until the nipple 24 is received through a suitably sized opening 48a in the mounting plate 48. The nipple 24 may be threadably connected to a female connector located on the opposite side of the plate 48. FIG. 16B shows an embodiment in which the sensor 1 is mounted using the one or more key-hole slots 36. In this embodiment, the nipple 24 is removed, and the sensor is moved in the direction of arrow "A" until the one or more key-hole slots 36 receive the heads and shanks of a pair of fasteners 48b attached to the mounting plate 48. As shown, the sensor 1 may be rotated in the direction of arrow "D" to lock the fastener shanks within the slots 36 in the manner previously described. FIG. 16C shows an embodiment in which the sensor 1 is mounted using the flat side portions 12b and the spring tabs 46. In this embodiment, the curved side portions 12a and flat side portions 12b are aligned with corresponding curved and flat portions 60, 62 of the opening in the mounting plate 48. The sensor is pressed into engagement with the plate in the direction of arrow "A" until the spring tabs 46 engage with the mounting plate 48.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

What is claimed is:

1. An occupancy or vacancy sensor, comprising:
   a housing having a front surface, a back surface, and a side surface, the side surface including a spring engagement member; and a mounting plate having a first face engageable with the back surface of the sensor housing and a second face including one or more key-hole slots and a nipple portion that extends away from the housing;

wherein the spring engagement member, the one or more key hole slots, and the nipple are configured to enable coupling of the sensor to a structure mounting surface via one or more of the spring engagement member, slots, and nipple, the spring engagement member is configured to enable selective coupling of the sensor to a correspondingly shaped surface of a structure mounting surface, the one or more key-hole slots are configured to enable selective coupling of the sensor housing to a fastener associated with the structure mounting surface, and the nipple portion is configured to enable selective coupling of the sensor housing to a female connector associated with the structure mounting surface.

2. The sensor mounting arrangement of claim 1, wherein the side surface includes a curved portion and a flat portion, the flat portion including the spring engagement member.

3. The sensor mounting arrangement of claim 2, wherein the front surface of the sensor housing includes an edge rim that conforms to the curved portion of the side surface, and that extends past the flat portion of the side surface, so that the front surface has a circular outer geometry.

4. The sensor mounting arrangement of claim 1, wherein the mounting plate comprises a side surface that conforms to the side surface of the sensor housing.

5. The sensor mounting arrangement of claim 1, wherein the side surface includes first and second curved portions and first and second diametrically opposed flat portions.

6. The sensor mounting arrangement of claim 1, wherein the nipple portion includes a plurality of threads and a snap detent, wherein the threads engage corresponding threads of the female connector, and wherein the snap detent prevents the female connector from decoupling from the nipple portion.

7. The sensor mounting arrangement of claim 1, wherein the nipple portion includes first and second flat side surfaces that are free of threads.

8. The sensor mounting arrangement of claim 1, wherein the nipple portion is selectively removable from the mounting plate.

9. The sensor mounting arrangement of claim 1, comprising an access guard coupled to the first face of the mounting plate, the access guard covering the one or more key-hole slots and an opening in the mounting plate corresponding to the nipple portion to prevent access to an interior of the housing via the one or more key-hole slots and the opening.

10. The sensor mounting arrangement of claim 1, further comprising a passive infrared (PIR) sensor associated with the front surface of the sensor housing and a lens portion overlying the occupancy sensor, the lens portion configured to fit against the front surface of the sensor housing.

11. The sensor mounting arrangement of claim 1, further comprising a lens assembly including a lens portion and a mounting portion;

wherein the housing has a forward recess portion for receiving the mounting portion of the lens assembly therein, the mounting portion being rotatable with respect to the housing to adjust a field of view of a sensor disposed behind the lens portion; and wherein the mounting portion of the lens assembly includes at least one protrusion for releasably engaging a protrusion of the sensor housing, the position of the mounting portion protrusion and the sensor housing protrusion being associated with a predetermined field of view of the sensor.

12. A method for mounting a sensor, comprising:

providing a sensor having a sensor housing and a mounting plate, the sensor housing having a front surface, a back surface, and a side surface, the side surface including a spring engagement member, the mounting plate engaged with the back surface of the sensor housing, the mounting plate having a face including one of more key-hole slots and a nipple portion that extends away from the housing;

selectively coupling the sensor housing and mounting plate to a structure mounting surface via one of a plurality of different mounting features disposed on the sensor housing and the mounting plate, wherein a first one of the plurality of different mounting features comprises the spring engagement member of the sensor housing, a second one of the plurality of different mounting features comprises one or more key-hole slots of the mounting plate, and a third one of the plurality of different mounting features comprises the nipple portion of the mounting plate.

13. The method of claim 12, wherein the side surface comprises a curved portion and a flat portion, the flat portion including the spring engagement member.

14. The method of claim 13, wherein selectively coupling the sensor housing and mounting plate to a structure comprises engaging the flat portion and the spring engagement member of the sensor housing with a correspondingly shaped recess of the structure mounting surface such that the flat portion prevents rotation of the sensor housing with respect to the structure mounting surface and the spring engagement member prevents axial movement of the sensor housing with respect to the structure mounting surface.

15. The method of claim 12, wherein the mounting plate comprises a side surface that conforms to the side surface of the sensor housing.

16. The method of claim 12, wherein selectively coupling the sensor housing and mounting plate to a structure comprises engaging the key-hole slot of the mounting plate with a fastener associated with the structure mounting surface.

17. The method of claim 16, comprising disconnecting the nipple portion from the mounting prior to engaging the key-hole slot of the mounting plate with a fastener associated with the structure mounting surface.

18. The method of claim 16, comprising rotating the sensor housing with respect to the structure mounting surface to lock the fastener within the key-hole slot.

19. The method of claim 16, wherein selectively coupling the sensor housing and mounting plate to a structure comprises engaging the nipple portion of the mounting plate with a female connector associated with the structure mounting surface.

20. The method of claim 19, wherein the nipple portion is threaded and coupling the nipple portion with the female connector comprises rotating the nipple portion and the female connector with respect to each other.

21. The method of claim 16, comprising preventing access to an internal portion of the sensor housing by disposing an access guard on the first face of the mounting plate, the access guard covering the one or more key-hole slots and an opening associated with the nipple portion.

22. The method of claim 16, comprising electrically coupling a sensor mounted in the sensor housing to building wiring via at least one wire disposed in a central opening of the mounting plate.

23. The method of claim 16, comprising electrically coupling a sensor mounted in the sensor housing to building wiring via at least one wire disposed in the mounting plate.

24. An arrangement for adjusting a field of view of an occupancy sensor, comprising:
a sensor housing; and
a lens assembly including a lens portion and a mounting portion;
the sensor housing having a forward recess portion for receiving the mounting portion therein, the mounting portion being rotatable with respect to the sensor housing to adjust a field of view of a sensor disposed behind the lens portion;
the mounting portion of the lens assembly having at least one protrusion for releasably engaging a protrusion of the sensor housing, the position of the mounting portion protrusion and the sensor housing protrusion being associated with a predetermined field of view of the sensor.

25. The arrangement of claim 24, wherein the sensor housing includes a plurality of protrusions associated with a plurality of different predetermined values of the field of view.

26. The arrangement of claim 24, wherein the plurality of protrusions of the sensor housing are spaced at 0-degrees, 45-degrees, 90-degrees, 135-degrees and 180-degrees with respect to a circumference of the sensor housing.

27. The arrangement of claim 24, wherein the interaction between the protrusion of the lens assembly and the protrusion of the sensor housing provides the user with a tactile response upon engagement.

28. The arrangement of claim 24, wherein the plurality of protrusions or recesses of the sensor housing are disposed on an inner surface of the sensor housing.

29. An occupancy or vacancy sensor, comprising:
a housing having a front surface, a back surface, and a side surface, the side surface including a spring engagement member; and
a mounting plate having a first face engageable with the back surface of the sensor housing and a second face including a nipple portion that extends away from the housing;
wherein the spring engagement member and the nipple are configured to enable coupling of the sensor to a structure mounting surface via one or both of the spring engagement member and nipple, wherein the spring engagement member is configured to enable selective coupling of the sensor to a surface of a structure mounting surface, and wherein the nipple portion is configured to enable selective coupling of the sensor housing to a female connector associated with the structure mounting surface.

* * * * *